US007602364B2

(12) United States Patent
Shih et al.

(10) Patent No.: US 7,602,364 B2
(45) Date of Patent: Oct. 13, 2009

(54) IMAGE STICKING ELIMINATION CIRCUIT

(75) Inventors: An Shih, Changhua (TW); Wenlong Weng, Keelung (TW); Chien-Chih Chen, Yonghe (TW); Chao-Yu Meng, Taichung (TW)

(73) Assignee: TPO Displays Corp., Chu-Nan (TW)

( * ) Notice: Subject to any disclaimer, the term of this patent is extended or adjusted under 35 U.S.C. 154(b) by 829 days.

(21) Appl. No.: 10/960,634

(22) Filed: Oct. 7, 2004

(65) Prior Publication Data

US 2005/0099376 A1 May 12, 2005

(30) Foreign Application Priority Data

Oct. 9, 2003 (TW) .............................. 92128045 A

(51) Int. Cl.
*G09G 3/36* (2006.01)
*G09G 5/00* (2006.01)
*G06F 3/038* (2006.01)

(52) U.S. Cl. ........................................ 345/98; 345/211

(58) Field of Classification Search ................... 345/98, 345/100, 82, 211, 204, 92
See application file for complete search history.

(56) References Cited

U.S. PATENT DOCUMENTS 5,945,970 A * 8/1999 Moon et al. ................. 345/211
6,064,360 A * 5/2000 Sakaedani et al. ........... 345/211
6,529,257 B1 3/2003 Nakano
6,590,411 B2 7/2003 Lee
7,109,965 B1 * 9/2006 Lee et al. ....................... 345/98
7,187,392 B2 * 3/2007 Ito ............................. 345/204

FOREIGN PATENT DOCUMENTS

JP 01-170986 7/1989
JP 09-269476 10/1997
JP 10-333642 12/1998
JP 2000-089193 3/2000
JP 2001-092416 4/2001

* cited by examiner

*Primary Examiner*—Kevin M Nguyen
(74) *Attorney, Agent, or Firm*—Liu & Liu

(57) ABSTRACT

An image sticking elimination circuit is provided for an abnormal power-off of a display unit. The image sticking elimination circuit comprises: a charge storage device and an isolation device. The isolation device being turned on when the abnormal power-off of a display occurs; wherein the charge storage device releases charges stored therein when the isolation device is turned on.

16 Claims, 7 Drawing Sheets

IMAGE STICKING ELIMINATION CIRCUIT

CROSS-REFERENCE TO RELATED APPLICATION

This application claims the priority benefit of Taiwan application serial no. 92128045, filed on Oct. 9, 2003.

BACKGROUND OF THE INVENTION

1. Field of the Invention

This invention generally relates to an image sticking elimination circuit, and more particularly to an image sticking elimination circuit suitable for sudden lost of power.

2. Description of Related Art

As shown in FIG. 5, the conventional LCD 500 includes a gate drive circuit 510, a data drive circuit 520, a plurality of gate lines 512, a plurality of date lines 522, and an array of display pixels each generally comprising a transistor 532, a capacitor 534 and a pixel cell 536. The gate line 512 and the data line 522 and associated components define a pixel unit 550. When the data signal is written (i.e., when the data signal is going to be displayed on the pixel unit 500), the gate drive circuit 510 will raise the gate line 512 from a low voltage level to a high voltage level so that the transistor 532 will be turned on. Then the data drive circuit 520 writes the data signal to the capacitor 534 via the data line 522 and the image corresponding to the data signal is displayed at the pixel cell 536. After the data signal is written into the capacitor 534, the gate drive circuit 510 will lower the gate line 512 from a high voltage level to a low voltage level so that the pixel cell 536 can maintain the image according to the data signal before the next data signal is written. However, once the abnormal power-off of the LCD 500 occurs (e.g., power-off of the display not by the pixel switches, but by sudden lost of power), the data signal is still stored in the capacitor 534. That is where the image sticking comes from.

The conventional solution to eliminate the image sticking shifts the I-V curve of the transistor 532 (as shown in FIG. 6) to the left so that the threshold voltage of the transistor 532 is close to 0V. Hence the transistor 532 can be turned on even if the gate voltage of the transistor 532 is close to 0V so that the data signal stored in the capacitor 534 can be released to the data line 522. The image sticking problem does not occur, however, the current leakage occurs instead due to the decreased threshold voltage.

SUMMARY OF THE INVENTION

The present invention provides an image sticking elimination circuit operatively coupled to the gate drive circuit in the gate driver for the pixel transistor. Once the abnormal power-off occurs, the pixel transistor is turned on by the output voltage of the image sticking elimination circuit. Thus the residual charges stored in the pixel will be released so as to eliminate the image sticking.

In one aspect, the present invention provides an image sticking elimination circuit for an abnormal power-off of a display unit, the image sticking elimination circuit being coupled to a gate drive circuit and a voltage converter. The image sticking elimination circuit comprises: a charge storage device having a first terminal and a second terminal, the first terminal of the charge storage device being coupled to a first voltage terminal of the voltage converter, the second terminal of the charge storage device being coupled to a ground; and an isolation device having a first terminal, a second terminal, and a third terminal, the first terminal of the isolation device being coupled to the first terminal of the charge storage device, the second terminal of the isolation device being coupled to the first voltage terminal of the voltage converter, the third terminal of the isolation device being coupled to a second voltage terminal of the gate drive circuit, the isolation device being turned on when the abnormal power-off of a display occurs; wherein the charge storage device releases charges stored therein when the isolation device is turned on.

In one embodiment of the present invention, it further comprises a diode having a first terminal and a second terminal, the first terminal of the diode being coupled to the first voltage terminal of the voltage converter, the second terminal of the diode being coupled to the first terminal of the charge storage device, and a current flowing from the first terminal of the diode to the second terminal of the diode.

In another embodiment of the present invention, a first terminal of the gate drive circuit is coupled to the first voltage terminal of the voltage converter, and a second terminal of the gate drive circuit is coupled to the second voltage terminal of the voltage converter.

The present invention provides an image sticking elimination circuit, the image sticking elimination circuit being coupled to a voltage converter and a gate drive circuit, comprising: a first terminal coupled to a first voltage terminal of the voltage converter; a second terminal coupled to a second voltage terminal of the gate drive circuit; and a resistor coupled to and between the first terminal and the second terminal of the gate drive circuit.

In still another embodiment of the present invention, it further comprises a resistor having a first terminal and a second terminal, the first terminal of the resistor being coupled to a common connection point between the first voltage terminal of the charge storage device and the second terminal of the diode, the second terminal of the resistor being coupled to the first terminal of the isolation device.

DESCRIPTION OF THE PREFERRED EMBODIMENTS

Figure 1A:
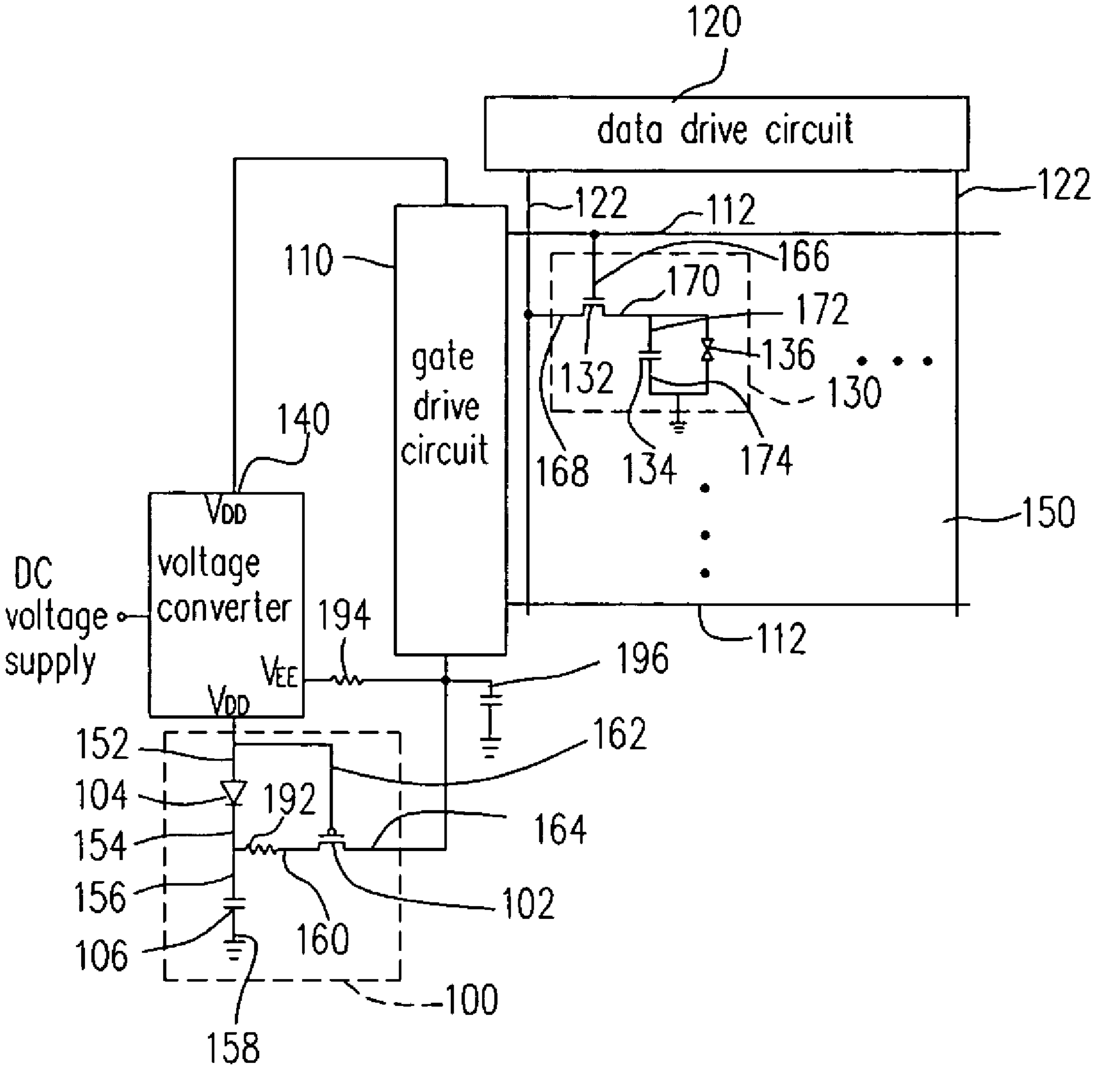
FIG. 1A is an image sticking elimination circuit in accordance with a first embodiment of the present invention.

FIG. 1A is a schematic representation of an LCD 10 that incorporates an image sticking elimination circuit 100 in accordance with one embodiment of the present invention. Referring to FIG. 1A, the image sticking elimination circuit 100 is coupled to a first voltage terminal ($V_{DD}$) of a voltage converter 140. Two terminals of a gate drive circuit 110 are coupled to the first voltage terminal ($V_{DD}$) and a second voltage terminal ($V_{EE}$) of the voltage converter 140, respectively. The display unit 150 includes a plurality of gate lines 112 and a plurality of data lines 122.

In addition, to facilitate the description of the present invention, an image control unit 130 will be described first. In FIG. 1A, only one image control unit 130 is shown. Practically, there can be several image control units 130. In this embodiment, the image control unit 130 includes a switch device 132, an image charge storage device 134, and a pixel cell 136. A first terminal 166 of the switch device 132 is coupled to the gate line 112. A second terminal 168 of the switch device 132 is coupled to the data line 122. A third terminal 170 of the switch device 132 is coupled to a first terminal 172 of the image charge storage device 134. A second terminal 174 of the image charge storage device 134 is coupled to the ground. One terminal of the pixel cell 136 is coupled to the first terminal 172 of the image charge storage device 134. The other terminal of the pixel cell 136 is coupled to the ground.

When a power supply provides power to the display unit 150, the voltage converter 140 provides the gate drive circuit 110 with a high voltage $V_{DD}$ and a low voltage $V_{EE}$. The high voltage can be 12V, and the low voltage can be −2V. When a data signal enters into the image control unit 130, the gate drive circuit 110 use the high voltage $V_{DD}$ (12V) to turn on the switch device 132 via the gate line 112. After the switch device 132 is turned on, the data drive circuit 120 writes the data signal into the image control unit 130 via the data line 122. After the data signal is written into the image control unit 130, the gate drive circuit 100 provides the low voltage (−2V) for the switch device 132 so that the switch device is turned off. The image control unit 130 will store the data signal in the image charge storage device 134 so that the pixel cell 136 can continue to display image before the next data signal is written (i.e., the switch device 132 is on again). Without the image sticking elimination circuit in accordance with the present invention, when the abnormal power-off on the LCD unit occurs, the data signal is still stored in the image charge storage device 134, which would otherwise cause image sticking as in the prior art.

Referring to FIG. 1A, the first embodiment of the present invention, the image sticking elimination circuit 100 includes an isolation device 102 having a first terminal 160, a second terminal 162, and a third terminal 164, a diode 104 having a first terminal 152 and a second terminal 154, and a charge storage device 106 having a first terminal 156 and a second terminal 158. The isolation device 102 can be, but not limited to, a P-type field effect transistor, the switch device 132 is a N-type field effect transistor accordingly. The charge storage device 106 can be, but not limited to, a capacitor. The first terminal 152 of the diode 104 is coupled to the first voltage terminal ($V_{DD}$) of the voltage converter 140. The second terminal 154 of the diode 104 is coupled to the first terminal 156 of the charge storage device 106. The second terminal 158 of the charge storage device 106 is coupled to the ground. The first terminal 160 of the isolation device 102 is coupled to the first terminal 156 of the charge storage device 106. The second terminal 162 of the isolation device 102 is coupled to the first voltage terminal ($V_{DD}$) of the voltage converter 140. The third terminal 164 of the isolation device 102 is coupled to a second voltage terminal of the gate drive circuit 110.

When the voltage converter 140 provides the power to the display unit 150 via the gate driver circuit 110, the voltage converter 140 also provides the positive voltage to the isolation device 102, the isolation device 102 is off and the charge storage device 106 will store the charges.

Figure 2:
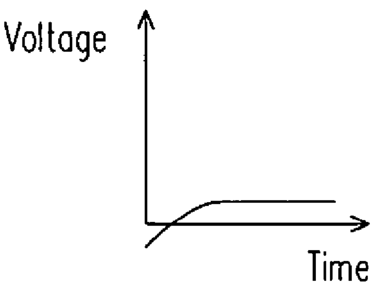
FIG. 2 is a voltage-time curve of the gate line in accordance with the first embodiment of the present invention.

FIG. 2 is a voltage-time curve of the gate line in accordance with the first embodiment of the present invention. Referring to FIG. 2, when the abnormal power-off of a display unit 150 occurs, the voltage of the second terminal 162 of the isolation device 102 is close to 0V. Hence, the isolation device 102 is turned on. The charge storage device 106 releases charges stored therein when the isolation device 102 is turned on so that the voltage level of the gate line 112 is raised up as shown in FIG. 2. In the meantime, the switch device 132 is turned on so that the image charge storage device 134 can release the charges to the data line 122, and the image sticking is eliminated.

In the first embodiment, the diode 104 is for the current flowing from the first terminal 152 of the diode 104 to the second terminal 154 of the diode 104. That is, when the charge storage device 106 discharges, the current only flows from the first terminal 160 of the isolation device 102 to the third terminal 164 of the isolation device 102, but the current will not flow through the diode 104. The isolation device 102 will be turned on when the voltage converter 140 does not provide the voltage.

Yet, the charge storage device 106 can be a capacitor of the display and does not have to be the additional capacitor.

Furthermore, the first terminal 160 of the isolation device 102 can be coupled to a large resistor 192 to prevent the isolation device 102 from damaged by a large current. In addition, an RC circuit (the resistor 194 and the capacitor 196 as shown in FIG. 1A) can be coupled to and between the voltage converter 140 and the second voltage terminal of the gate drive circuit 110 to ensure that the voltage is raised (e.g., to 0.7V) so that the voltage converter 140 can works normally and the voltage $V_{EE}$ can be stable.

Figure 1B:
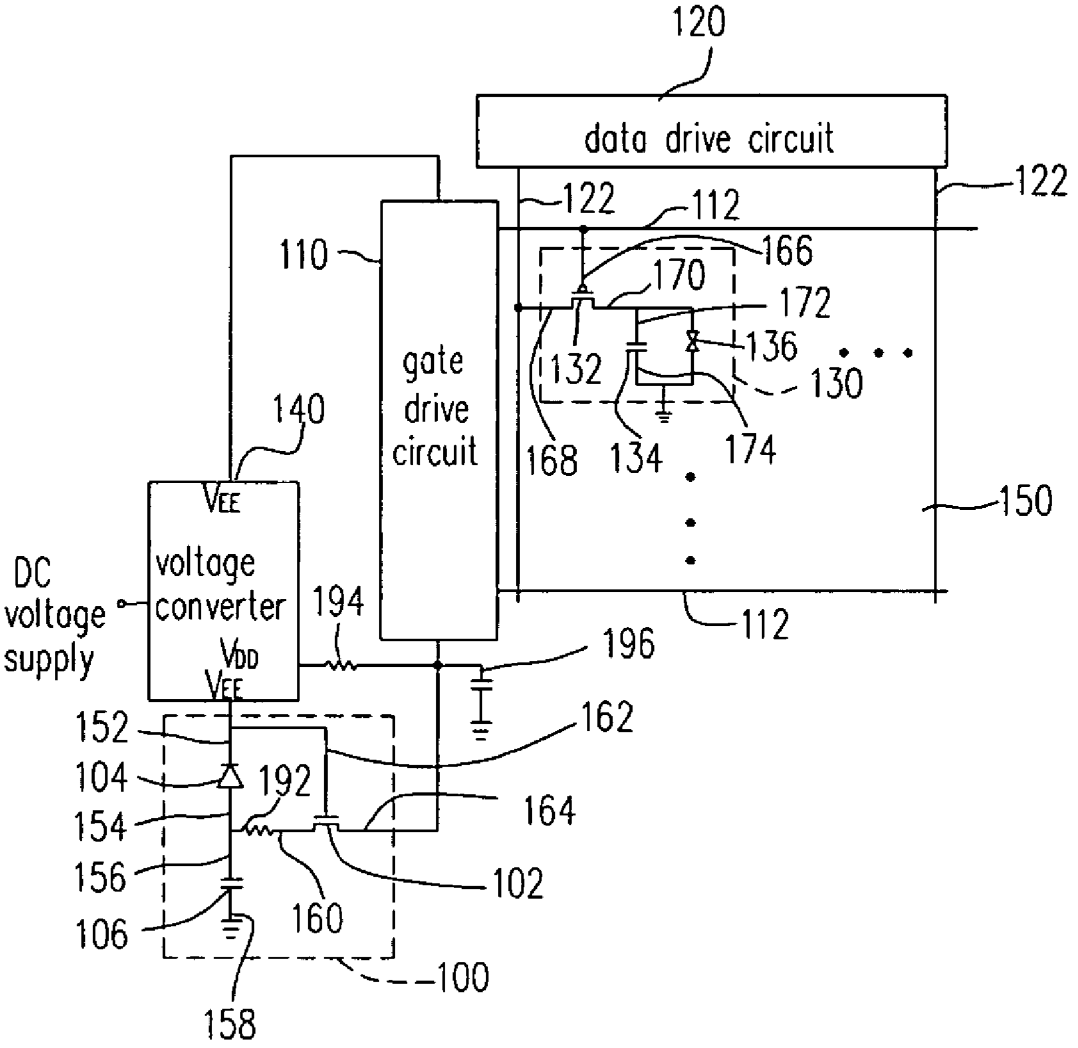
FIG. 1B is an image sticking elimination circuit in accordance with a modification of the first embodiment of the present invention.

FIG. 1B is an image sticking elimination circuit in accordance with a modification of the first embodiment of the present invention. Compared to FIG. 1A, the isolation device is an N-type field effect transistor rather than a P-type field effect transistor; the switch device 132 is a P-type field effect transistor. The first terminal of voltage converter 140 is coupled to the resistor 194. The second terminal of voltage converter 140 is coupled to the gate drive circuit 110 and the first terminal 152 of the diode 104. The second terminal 154 of the diode 104 is coupled to the first terminal 156 of the charge storage device 106. When the voltage converter 140 supplies the power, the isolation 102 is off and the current in the charge storage device 106 flows through the diode 104. Hence, the voltage level of the charge storage device 106 will be the same as that of the second voltage terminal. When the voltage converter 140 does not supply the power, the voltage level of the charge storage device 106 is negative and the voltage of the isolation device 102 is 0V. Hence the isolation device 102 is turned on and the switch device 132 is turned on. Therefore, the image charges stored in the image charge storage device 134 will be released to the data line 122 via the switch device 132.

Figure 3A:
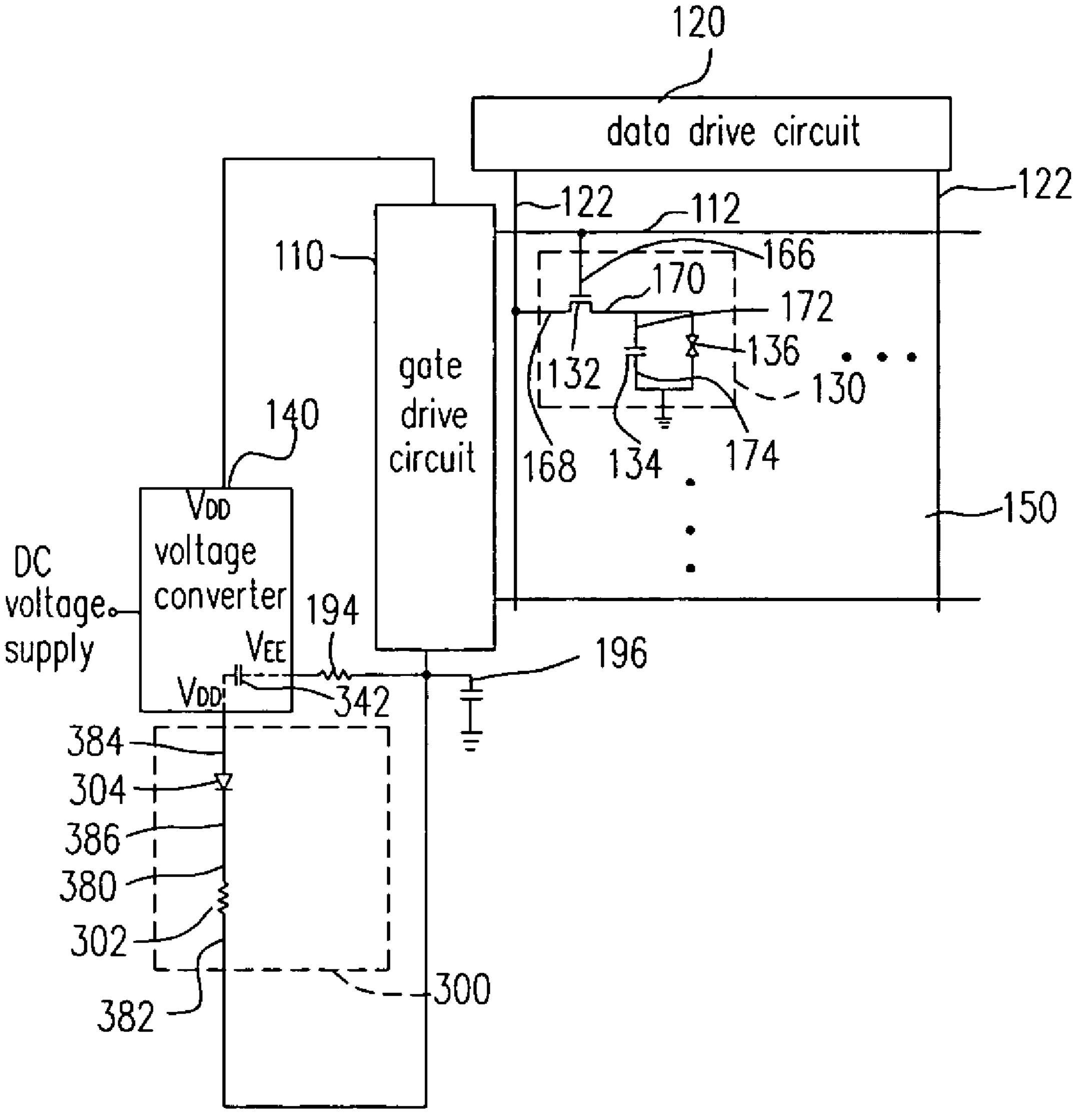
FIG. 3A is an image sticking elimination circuit in accordance with a second embodiment of the present invention.
Figure 4:
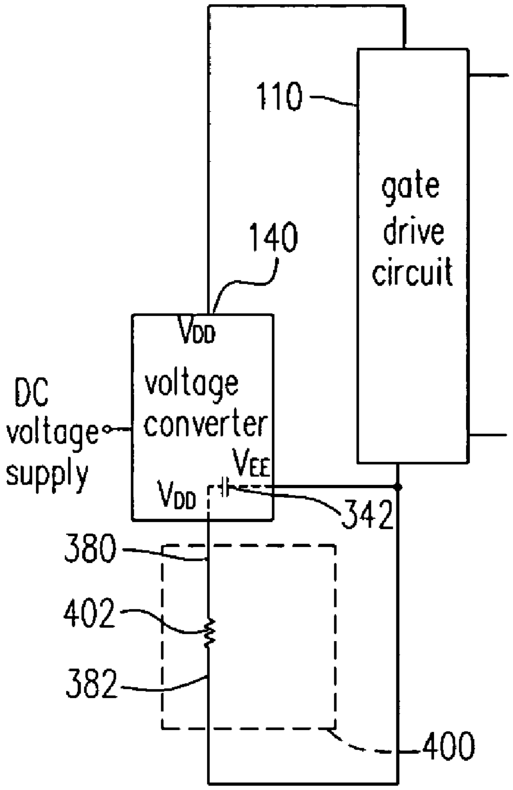
FIG. 4 is an image sticking elimination circuit in accordance with a third embodiment of the present invention.
Figure 5:
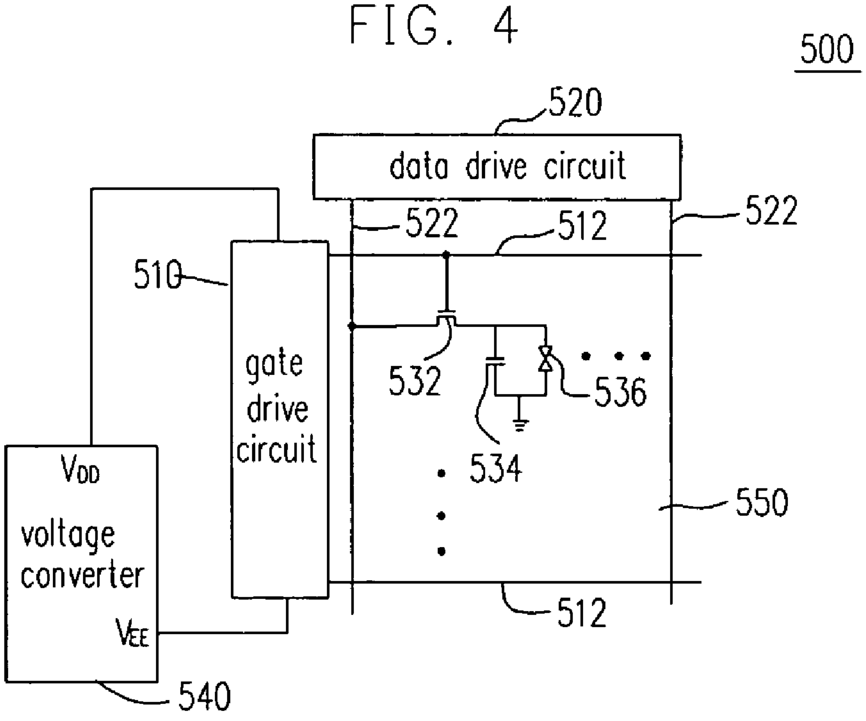
FIG. 5 (PRIOR ART)
FIG. 5 is a conventional LCD.
Figure 6:
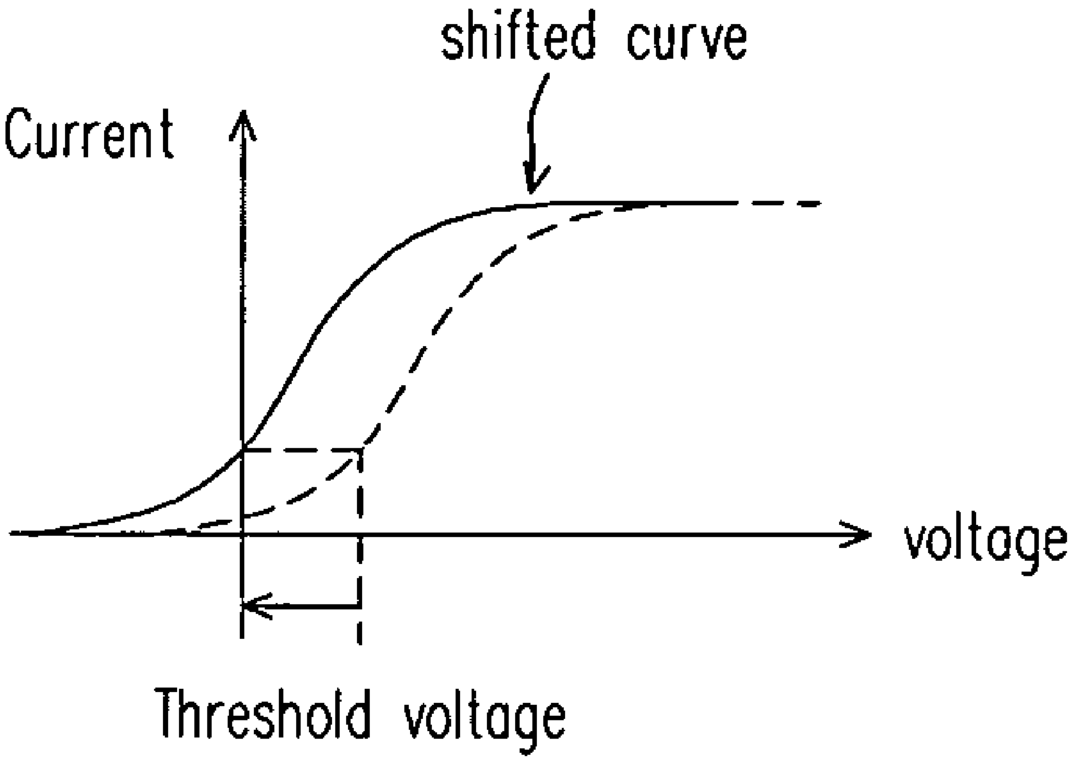
FIG. 6 shows an I-V curve of a thin film transistor.

FIG. 3A is an image sticking elimination circuit in accordance with a second embodiment of the present invention. FIG. 4 is an image sticking elimination circuit in accordance with a third embodiment of the present invention. Compared to FIG. 1A, the devices in the image sticking elimination circuits 300 and 400 are different from the image sticking elimination circuit 100.

In the second embodiment, the image sticking elimination circuit 300 includes a large resistor 302 and a diode 304. The first terminal 380 of the large resistor 302 is coupled to the second terminal 386 of the diode 304. The second terminal 382 of the large resistor 302 is coupled to the second voltage terminal of the gate drive circuit 110. The first terminal 384 of the diode 304 is coupled to the first voltage terminal ($V_{DD}$) of the voltage converter 140.

The large resistor 302 can prevent the high voltage from entering into the gate of the switch device 132 when the voltage converter supplies the voltage normally. When the abnormal power-off of the voltage converter 140 occurs, the parasitic capacitor 342 can release the stored charges (as shown in FIG. 3C) to speed up the leakage of the switch device 132 so that the image charges in the image charge storage device 134 can be quickly released to the data line 122.

In the third embodiment, the image sticking elimination circuit 400 only include a large resistor 402 as shown in FIG. 4, which operates in the same manner as the resistor 302.

Figure 3B:
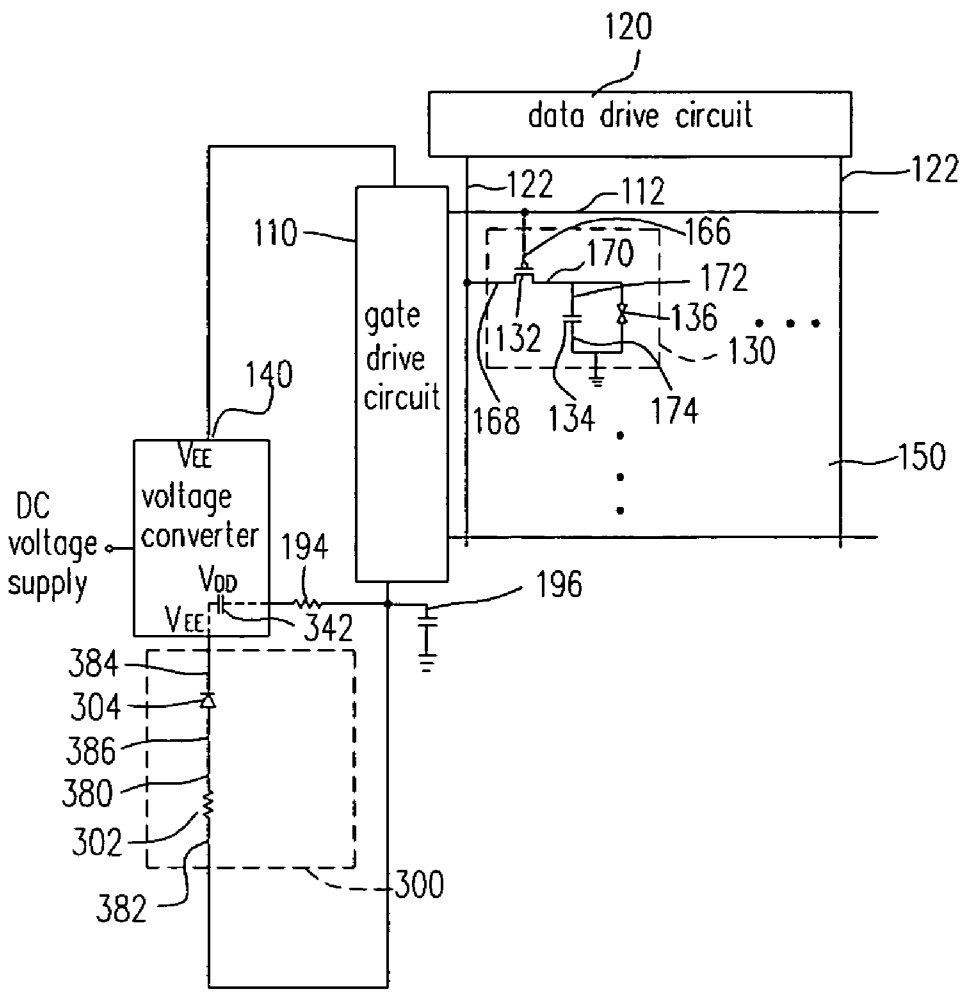
FIG. 3B is an image sticking elimination circuit in accordance with a modification of the second embodiment of the present invention.
Figure 3C:
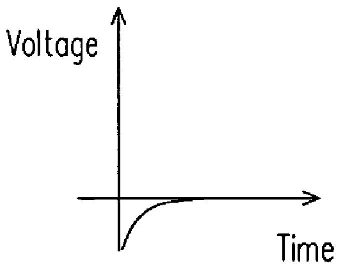
FIG. 3C is a voltage-time curve of the gate line in accordance with the second embodiment of the present invention.

FIG. 3B is an image sticking elimination circuit in accordance with a modification of the second embodiment of the present invention. Compared to FIG. 3A, the switch device 132 is a P-type field effect trasnsistor rather than an N-type field effect trasnsistor. Hence the current flows form the second terminal 386 to the first terminal 384. The first voltage terminal of the voltage converter 140 is coupled to the resistor 194 and the second voltage terminal is coupled to the first terminal 384 of the diode 304 and the gate drive circuit 110. The large resistor 302 can prevent the low voltage from entering into the gate of the switch device 132 when the voltage converter 140 supplies the voltage normally. When the abnormal power-off of the voltage converter 140 occurs, the parasitic capacitor 342 can release the stored charges (as shown in FIG. 3C) to speed up the leakage of the switch device 132 so that the image charges in the image charge storage device 134 can be quickly released to the data line 122.

In the second and third embodiment of the present invention, although the current leakage exists in the image sticking elimination circuits 300 and 400, the amount of the leakage is limited and will not affect the $V_{EE}$ required by the gate drive circuit.

In a the second and third embodiment of the present invention, the large resistors 302 and 402 range from, but not limited to, 100 k to 10 M Ohm.

The voltage converter 140 of the present invention can be, but not limited to, a DC-to-DC converter, and the switch device 132 can be, but not limited to, an LTPS-TFT; the image charge storage device 134 can be, but not limited to, a capacitor. Besides, the voltage converter 140 is coupled to a DC voltage supply and converts the DC voltage to the DC voltage required by the circuits in the display.

In the first and second embodiment of the present invention, the switch device 132 is a N-type field effect transistor; the isolation device 102 is a P-type field effect transistor. However, when the switch device 132 is P-type field effect transistor, the isolation device 102 is an N-type field effect transistor and the direction of the diode 104 is opposite to that in FIG. 1A.

Figure 7:
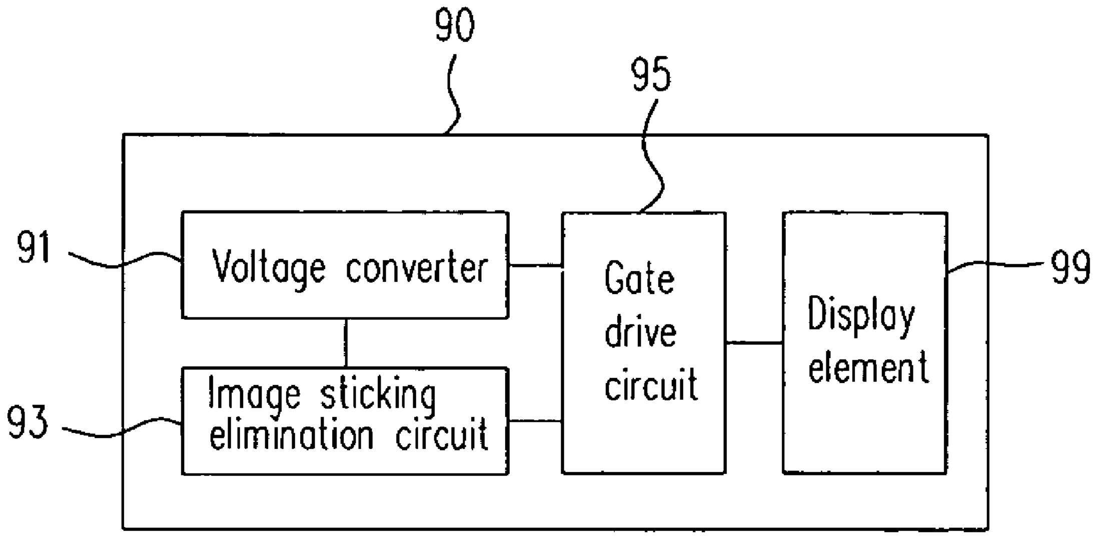
FIG. 7 is a schematic diagram of a display device comprising an image sticking elimination circuit in accordance with one embodiment of the present invention.

FIG. 7 is a schematic diagram illustrating a display device incorporating an image sticking elimination circuit in accordance with one embodiment of the present invention. A display device 90 comprises an image sticking elimination circuit 93 coupled between a voltage converter 91 and a gate drive circuit 95 and the gate drive circuit 95 is connected to a display element 99. The voltage converter 91 converts input voltage into a desired voltage to operate the gate drive circuit 95. When a DC voltage is supplied to the voltage converter 91, the converted voltage is directed to the gate drive circuit 95. However, when sudden lost of power occurs, the image sticking elimination circuit 93 can release the stored charges of the display element 99.

Figure 8:
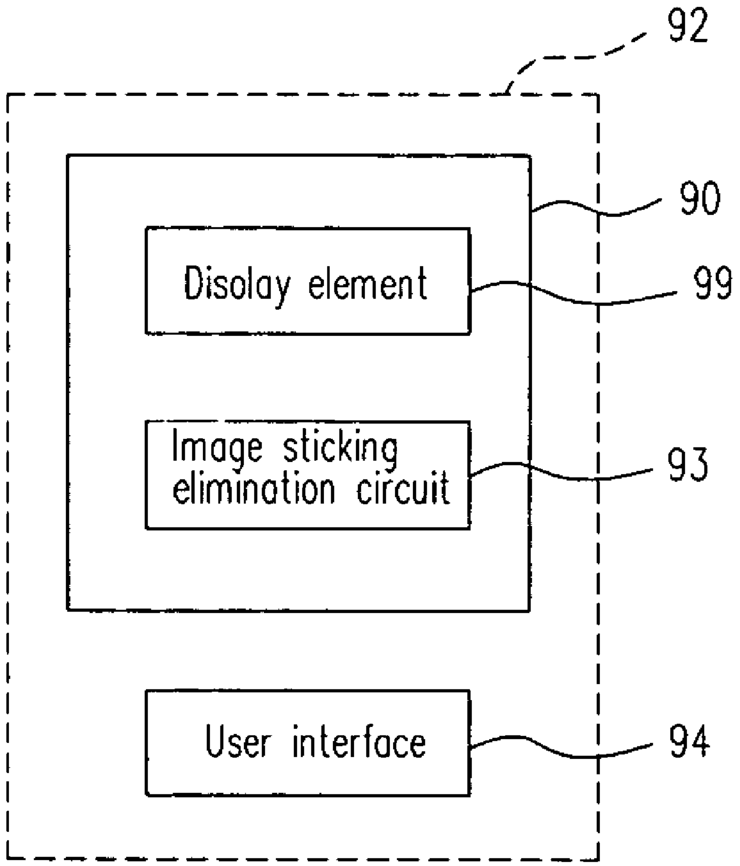
FIG. 8 is a schematic diagram of an electronic device having a display device that incorporates the image sticking elimination circuit in accordance with one embodiment of the present invention.

FIG. 8 schematically shows an electronic device 100 deploying a display device 90 having an image sticking elimination circuit 93 as described above. The electronic device 100 may be a portable device such as PDA, notebook computer, tablet computer, cellular phone, display monitor device, or other. Generally, the electronic device 100 comprises a housing 92, the display device 90 comprising the image sticking elimination circuit 93 and a display element 99, and a user interface 94, etc. Further, the user interface 94 has a switch (not shown) to power on the display element 99. Once, abnormal power-off (without via the switch) happens to the electronic device 100, the image sticking elimination circuit 93 can help to drain away the residual charges stored in the display element 99.

While the image sticking elimination circuit is described in connection with an LCD display system, it may be deployed in other display systems, such as those deploying a plasma display element, an organic light emitting display or a cathode ray tube display element.

In summary, the image sticking elimination circuit of the present invention does not have to adjust the I-V curve of the image control unit and can avoid the leakage current issue, so the image sticking elimination circuit will not affect the performance of the display. When the abnormal power-off occurs, the residual charges stored in the charge storage device will raise the gate line to a high voltage level and turn on the switch in the image control unit. Hence the image charges stored in the image charge storage device will be released to eliminate the image sticking.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. An image sticking elimination circuit for an abnormal power-off of a display unit, said image sticking elimination circuit being coupled to a gate drive circuit and a voltage converter, said image sticking elimination circuit comprising:

a charge storage device having a first terminal and a second terminal, said first terminal of said charge storage device being coupled to a first voltage terminal of said voltage converter, said second terminal of said charge storage device being coupled to a ground; and a diode having a first terminal and a second terminal, said first terminal of said diode being coupled to said first voltage terminal of said voltage converter, said second terminal of said diode being coupled to said first terminal of said charge storage device;

an isolation device having a first terminal, a second terminal, and a third terminal, said first terminal of said isolation device being coupled to said first terminal of said charge storage device, said second terminal of said isolation device being coupled to and between said first voltage terminal of said voltage converter and said first terminal of said diode, said third terminal of said isolation device being coupled to a second voltage terminal of said gate drive circuit, said isolation device being turned on when said abnormal power-off of a display occurs;

wherein said charge storage device releases charges stored therein when said isolation device is turned on.

2. The circuit of claim 1, wherein a current flows from said first terminal of said diode to said second terminal of said diode, wherein said isolation device is a P-type field effect transistor.

3. The circuit of claim 2, wherein a terminal of said gate drive circuit is coupled to said first voltage terminal of said voltage converter, and an another terminal of said gate drive circuit is coupled to said second voltage terminal of said voltage converter.

4. The circuit of claim 1, wherein a current flows from said second terminal of said diode to said first terminal of said diode, wherein said isolation device is a N-type field effect transistor.

5. The circuit of claim 1, wherein said charge storage device is a capacitor.

6. The circuit of claim 1, wherein said voltage converter is a DC-to-DC converter.

7. The circuit of claim 1, wherein said display unit is a liquid crystal display unit.

8. The circuit of claim 1, wherein said display unit is an organic light emitting diode unit.

9. The circuit of claim 1, wherein said first voltage terminal is a high voltage terminal and said second voltage terminal is a low voltage terminal.

10. A display device, comprising:

a pixel unit;

a data driver, coupled to the pixel unit; and a gate driver as in claim 1, coupled to the pixel unit.

11. An electronic device, comprising:

a display device as in claim 10;

a source of data image;

a controller operatively coupled to the display device and the source, providing the image data to render an image on the display.

12. An image sticking elimination circuit, said image sticking elimination circuit being coupled to a voltage converter and a gate drive circuit, comprising:

a first terminal, directly coupled to a first voltage terminal of said voltage converter, wherein a second voltage terminal of said voltage converter is coupled directly to a first voltage terminal of said gate drive circuit;

a second terminal, coupled to a second voltage terminal of said gate drive circuit; and a resistor, coupled to and between said first terminal and said second terminal, wherein the voltage converter comprises a parasitic capacitance having one terminal coupled to the first terminal, and another terminal coupled to the second terminal and the second voltage terminal of the gate drive circuit via a resistor and capacitor circuit, and wherein said one and another terminals of the parasitic capacitance are directly coupled to the first voltage terminal and second voltage terminal, respectively, of the voltage converter.

13. The circuit of claim 12, further comprising a diode having a first terminal and a second terminal, said first terminal of said diode being coupled to said first voltage terminal of said voltage converter, said second terminal of said diode being coupled to a first terminal of said resistor, a current flowing from said first terminal of said diode to said second terminal of said diode.

14. The circuit of claim 12, further comprising a diode having a first terminal and a second terminal, said first terminal of said diode being coupled to said first voltage terminal of said voltage converter, said second terminal of said diode being coupled to a first terminal of said resistor, a current flowing from said second terminal of said diode to said first terminal of said diode.

15. The circuit of claim 12, wherein said resistor ranges from 100 k-10 M Ohm.

16. The circuit of claim 12, wherein said first voltage terminal of the voltage converter is a high voltage terminal and said second voltage terminal of the voltage converter is a low voltage terminal.

* * * * *